United States Patent [19]

Scriver

[11] Patent Number: 4,894,420

[45] Date of Patent: Jan. 16, 1990

[54] TIRE WITH TREAD OF SELECTIVE RUBBER BLEND

[75] Inventor: Richard M. Scriver, Atwater, Ohio

[73] Assignee: The Goodyear Tire & Rubber Company, Akron, Ohio

[21] Appl. No.: 243,970

[22] Filed: Sep. 14, 1988

[51] Int. Cl.$^4$ ............... C08L 9/00; C08L 9/02/9/06; C08L 7/00

[52] U.S. Cl. .................... 525/237; 152/209 R; 525/236

[58] Field of Search ............. 525/236, 237; 152/209 R

[56] References Cited

U.S. PATENT DOCUMENTS

| | | | |
|---|---|---|---|
| 3,873,489 | 3/1975 | Thurn et al. | 524/571 |
| 3,928,291 | 12/1975 | Sandra, Jr. | 525/359.4 |
| 4,407,985 | 10/1983 | Muller | 524/563 |
| 4,616,065 | 10/1986 | Hargis et al. | 525/237 |

*Primary Examiner*—Allan M. Lieberman
*Attorney, Agent, or Firm*—H. C. Young, Jr.

[57] ABSTRACT

A pneumatic tire with tread composed of a sulfur cured rubber comprised of, based on the rubber, (A) cis 1,4-polyisoprene, (B) at least one of isoprene/acrylonitrile rubber and butadiene/acrylonitrile rubber and, optionally, (C) at least one additional rubber.

5 Claims, 1 Drawing Sheet

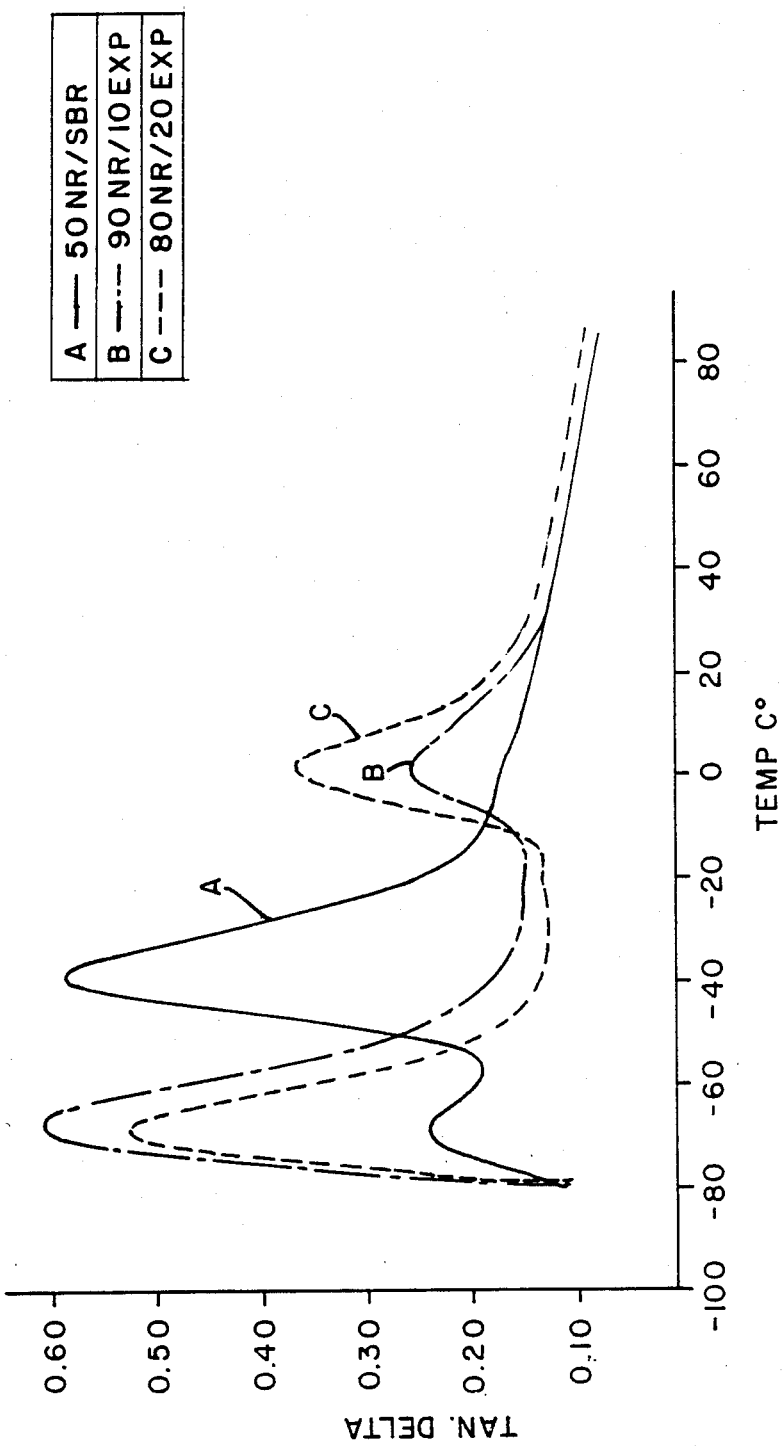

TIRE WITH TREAD OF SELECTIVE RUBBER BLEND

Field of Invention

This invention relates to tires having treads composed of selected rubber blends. The invention further relates to tires having treads with a balance of viscoelastic properties.

BACKGROUND OF THE INVENTION

Pneumatic rubber passenger and truck tires are composed of elements which conventionally include a tread of a rubber composition. The tread rubber is sometimes desirably compounded to provide a tire with a relatively low rolling resistance with reasonable wear and traction.

Viscoelastic properties of the tread rubber itself are important and basically determinative considerations for its performance, particularly for rolling resistance and skid resistance of the tire.

Although it may be desired to compound the tire's tread composition to reduce the rolling resistance of the tire without substantially degrading the tire's traction features, tire traction might be expected to be somewhat sacrificed as may be evidenced by its reduction in wet and dry skid resistance.

Tire treads are often composed of synthetic rubber or blends of synthetic rubber with natural rubber for the purpose of achieving desirable tire tread characteristics such as wear, traction and reduction in rolling resistance. Various synthetic rubbers have been used in the manufacture of tires with such treads including styrene/butadiene copolymers (prepared by emulsion or solution polymerization methods) sometimes referred to as SBR, high cis 1,4 polybutadiene rubber as well as medium and high vinyl (1,2-) polybutadiene rubbers. Sometimes a synthetic cis 1,4-polyisoprene has, at least in part, been substituted for the natural rubber in tire tread compositions.

Although such rubber compositions are taught to provide various benefits, some for tire treads it continues to be desirable to provide a pneumatic tire having a rubber tread having an enhanced rolling resistance and/or treadwear commensurate with reasonable traction qualities.

Viscoelastics properties of the rubber, or rubber blend, itself are important. For low rolling resistance of the tire, a tan. delta optimization for a temperature in the range of about 40° C. to about 60° C. is desired whereas a tan. delta optimization for a temperature range of about −10° C. to about 20°0 C. is desired for good skid resistance. It is difficult to adjust a rubber blend for a tan. delta optimization substantially simultaneously for both temperature ranges and, thus, for both rolling resistance and skid resistance.

STATEMENT AND PRACTICE OF INVENTION

In accordance with this invention, a pneumatic tire is provided having an outer circumferential tread where said tread is a sulfur cured rubber composition comprised of, based on 100 parts by weight rubber (phr), (A) about 30 to about 90, preferably about 50 to about 90, parts by weight cis 1,4-polyisoprene rubber, (B) about 5 to about 20, preferably about 10 to about 15, parts by weight of at lease one synthetic rubber selected from at least one of isoprene/acrylonitrile copolymer and butadiene/acrylonitrile copolymer comprised of from about 20 to about 40 mole percent units derived from acrylonitrile and about 60 to about 80 mole percent units derived from isoprene or butadiene in which the glass transition temperature of the rubber is from about −40° C. to about −5° C., and (C) about 0 to about 35, weight percent of at least one of styrene/butadiene copolymer rubber, 1,4-polybutadiene rubber containing up to 10 percent vinyl unsaturation, 1,4-polybutadiene rubber having from 30 to 70 percent vinyl unsaturation and isoprene/butadiene copolymer rubber.

In the description of this invention, the cis 1,4-polyisoprene rubber is intended to include both natural and synthetic rubber. Often, the natural rubber is preferred. The cis 1,4-polyisoprene rubber, natural or synthetic, typically has a cis 1,4-content of about 96 to about 99 weight percent.

For the isoprene/acrylonitrile and/or butadiene/acrylonitrile rubber component of the composition, the isoprene/acrylonitrile rubber is preferred. However, both rubbers are well known to those having skill in the art.

The optional polybutadiene rubber can be composed of 95% or more of cis 1,4 structure when prepared with Ziegler-type catalyst or can be composed at least 90% cis and trans 1,4 structure when prepared with alkyl lithium catalyst. Both types of rubbers are well known. The medium (30-50%) to high (50-70%) vinyl polybutadiene is also well known.

The styrene/butadiene rubber (SBR) can be prepared by solution or emulsion polymerization.

When component (C) of the tread composition is used, generally it is preferred that from about 10 to about 35 parts (phr) are used.

A preferred embodiment of the invention, particularly for tires to be used for somewhat conventional loads and speeds such as passenger vehicle tires, although the embodiment is not necessarily limited to such use, is a pneumatic tire provided with such tread where said tread is a sulfur cured rubber composition comprised of, based on 100 parts by weight rubber (phr), (A) about 50 to about 90 phr natural rubber, (B) about 5 to about 20 phr of said isoprene/acrylonitrile rubber and (C) about 0 to about 35 phr of at least one other rubber selected from SBR, 1,4-polybutadiene, and 1,4-polybutadiene with 30-70 percent vinyl content.

Such pneumatic tires are conventionally comprised of a generally toroidal shaped carcass with an outer circumferential tread, adapted to be ground contacting, spaced beads and sidewalls extending radially from and connecting said tread to said beads.

The rubbers used herein, particularly those in the higher ML-4 (Mooney) viscosity range, can optionally be individually oil extended before or during mixing with various rubber compounding materials for ease of processing. If oil extension is used, usually about 10 to about 50 phr of rubber processing oil is used, usually of the aromatic or aromatic/paraffinic oil type, to provided a ML-4 (100° C.) viscosity of about 40 – 100, preferably about 60 to about 90, for the uncured rubber composition.

It should readily be understood by one having skill in the art that said tread portion of the pneumatic tire as well as the rubber or other material in the basic carcass, which normally contains reinforcing elements in the tread region, can be compounded by methods generally known in the rubber compounding art, such as mixing the various constituent rubbers with various materials such, as for example, curing aids, such as sulfur and accelerators, processing additives, such as oils, resins, silicas, and plasticizers, fillers, pigments, antioxidants and antiozonants and reinforcing materials such as, for example, carbon black.

The tire can be built, shaped, molded and cured by various methods which will be readily apparent to those having skill in the art.

In the practice of this invention, the polymer blend-tread can be integral with and adhered to various tire carcass substrate rubber compositions. Typically, such a rubber composition is at least one of a butadiene/styrene copolymer rubber, cis 1,4 polyisoprene (natural or synthetic rubber) and 1,4 polybutadiene.

In the further practice of this invention, the tread can typically be applied in the building of the green tire in which the uncured, shaped tread is built onto the carcass following which the green tire is shaped and cured.

Alternately, the tread can be applied to a cured tire carcass from which the previous tread has been buffed or abraded away and the tread cured thereon as a retread.

In the practice of this invention, the acrylonitrile copolymer rubber is a particularly desirable and required feature of the rubber tread. The precise structure of such rubber itself may not be entirely understood, although the acrylonitrile units in the rubber can be random, block or tapered. It has been observed that its inclusion in the rubber blend of a tire tread has provided a tire with enhanced characteristics as a desirable combination of rolling resistance, skid resistance and treadwear.

The isoprene/acrylonitrile rubber can be more fully described as a random emulsion polymerization prepared copolymer.

The butadiene/acrylonitrile rubber can be more fully described as a random emulsion polymerization prepared copolymer.

For further description and understanding of this invention, reference is made to the accompanying drawing which represents the relationship between tan.delta and temperature for the sulfur cured rubber blend of this invention as compare to a control of 50/50 blend of natural rubber and solution prepared SBR having a high vinyl content (about 40-60 percent).

Referring to the drawing, curves are shown for three cured rubber blends, identified as control curve (A) experimental blend (B) and experimental blend (C) as referenced in the following table.

| Rubber Blends | |
|---|---|
| Blend Identification | Rubber Components |
| 1. Control (A) | 50% natural rubber 50% SBR rubber[1] |
| 2. Experimental (B) | 80% natural rubber 20% isoprene/ acrylonitrile rubber[2] |
| 3. Experimental (C) | 90% natural rubber 10% isoprene/ acrylonitrile rubber[2] |

[1] A solution polymerization prepared SBR, copolymer having a vinyl content of 40% to 60%.
[2] An isoprene/acrylonitrile copolymer rubber having an isoprene/acrylonitrile ratio in a range of about 70/30.

Samples of the sulfur cured rubber blends were prepared and tested by Rheometrics Viscometer tester (System IV), obtained from the Rheometrics Company, to determine the relationship between tan, delete and temperature. During the test, the samples undergo compression (0.5% defletion) (1 Hz frequency) for about 5 minutes while gradually increasing their temperature (the temperature increases by automatically controlled steps after first being pre-cooled).

The Rheometrics'instrument provides a measure of the tan. delta values and such values are then plotted against temperature.

The tan. delta is, basically, a ratio of lost modulus (E") to storage modulus (E'). The E'is considered a measure of the rubber's ability to dissipate energy and the E" is considered a measure of the rubber's ability to absorb energy. Thus, in effect, the tan. delta is a measure of a compound's viscoelastic character and has been observed to relate to tire performance.

It has been observed that, in practice, a low tan. delta in the region of 40° C. to 60° C. is desirable for a tire tread to provide a tire with good rolling resistance while a high tan. delta in the region of 10° C. to 20° C. is desirable for a tire tread to provide a tire with good wet traction.

The curve for control tread rubber (A) exhibits a high tan. delta in the region of $-10°$ C. to $+20°$ C., thus, predictably suitable for providing a tire with good wet traction and a low tan. delta in the region of 40° C. to 60° C., thus, predictably suitable for a tire with good rolling resistance for this rubber blend.

The importance of such phenomenon that the rubber blend of this invention enables a relative optimization of the property of tan.delta for prescribed temperatures while also maintaining or even optimizing the property of a tire's rolling resistance and wet skid resistance.

The curve for rubber (B) shows a higher tan.delta in the $-10°$to $+20°$C. range, thus, predicting a better traction than (A) and a tan.delta as low as curve (A) suggesting equal rolling resistance, as compared to curve (A), for this rubber blend.

The curve (C) shows a yet higher tan.delta in the prescribed temperature range but a slightly higher tan.delta at the 40° C. to 60° C. so will expect a slight loss in rolling resistance for this rubber blend.

The advantages of such dual optimization are many fold, particularly including rolling resistance and skid resistance.

A further and significant observed advantage of the rubber blend of this invention is improved treadwear and particularly irregular wear.

While the contribution of various elements or components of a composition are not always completely understood, it is believed an important and significant component of the blend is the isoprene/acrylonitrile rubber and butadiene/acrylonitrile rubber which apparently provides unique viscoelastic properties with the remainder of the rubber(s).

The practice of this invention is further illustrated by reference to the following examples which are intended to be representative rather than restrictive of the scope of the invention. Unless otherwise indicated, all parts and percentages are by weight.

EXAMPLE I

Rubber compounds composed of blends of natural rubber and butadiene/styrene rubber (SBR) (Compound X, a control): of natural rubber and isoprene/acrylonitrile copolymer (IAR) (Compound Y) and butadiene/acrylonitrile copolymer rubber (BAR)

(Compound Z) were comprised of the following recipe depicted in Table 1.

TABLE 1

| Material | (Phase 1) Parts (Rounded Valves) | | |
|---|---|---|---|
| | X | Y | Z |
| Natural Rubber | 50 | 85 | 85 |
| SBR | 50 | — | — |
| IAR (66/34) | — | 15 | — |
| BAR | — | — | 15 |
| Processing Oil | 3.5 | 3.5 | 3.5 |
| Antidegradant | 3 | 3 | 3 |
| Stearic Acid | 2 | 2 | 2 |
| Carbon black/silica (40/15 ratio) | 55 | 55 | 55 |
| Zinc Oxide | 3 | 3 | 3 |
| Sulfur | 1 | 1 | 1 |
| Accelerator(s) | 1.6 | 1.6 | 1.6 |

TABLE 2

| Property[1] | Compound X | Compound Y | Compound Z |
|---|---|---|---|
| Hot Rebound | 67 | 67 | 66 |
| Cold Rebound | 49 | 37 | 37 |
| Hardness (25° C.) | 67 | 73 | 68 |
| Strebler Adhesion (Tear) "With Itself" (Newtons) | 100 | 370 | 222 |
| Tensile (MPa) | 21 | 24 | 24 |
| Rheometer (a) (150°-90% cure)(min.) | 16 | 8 | 10 |
| Tan. delta (0°) | .192 | .314 | .301 |
| Tan. delta (60°) by Rheometrics Tester | .128 | .130 | .136 |

[1]Properties determined by conventional rubber procedures.

EXAMPLE II

Pneumatic tires of conventional construction (grooved read, sidewalls, spaced beads, and supporting fabric-reinforced carcass) were built, shaped and cured in a conventional tire mold. The tread was built onto the uncured carcass as a pre-extruded element. The tires were of the LT 215/75R15 WRANGLER ST, Load Range D, type which indicates that they were belted, radial ply light truck type tires.

One tire is identified herein as Control XX and another tire identified as Experimental YY.

Control tire XX had a tread composed of (A) 70 phr butadiene/styrene rubber (high vinyl —40 to 60 percentsolution polymerization prepared SBR), (B) 20 phr natural rubber, and (C) 10 phr of 1,4-polybutadiene rubber is intended to represent a somewhat conventional light truck tire tread.

Experimental tire YY had a tread composed of (A) 10 phr Isoprene/Acronitrile having a Tg in the range of about 31 30° C. to about —40° C., (B) 50 phr natural rubber, and (C) 40 phr SBR.

The tires (XX and YY) were mounted on rims, inflated and submitted to testing. The test values for the control were normalized to a value of 100 for comparison purposes. The tire with the experimental tread was tested and its test values compared to the values of the control tire and reported relative to the normalized values of 100.

Surprisingly, the tire YY with the experimental tread rubber composition exhibited an improved (increased) wet skid resistance while maintaining rolling resistance as compared to control tire XX. This is considered to be an important departure from ordinarily expected results and a result of the viscoelastic phenomenon primarily attributed to the isoprene/acrylonitrile rubber as predicted in the curves presented in the drawing of this specification.

Table 3 illustrates the rolling resistance, wet skid resistance values with the Experimental Tire YY compared to values of Control Tire XX normalized to 100.

TABLE 3

| Measured Vales[1] | Control XX | Experimental YY |
|---|---|---|
| Rolling resistance (67" wheel) | 100 | 100 |
| Wet skid resistance (20 mph) | 100 | 105 (improved) |
| Dry skid resistance (40 mph) | 100 | 102 (improved) |
| Treadwear (irregular) (Visual Inspection) | 100 | — (improved) |

[1]Measured by conventional tire test procedure.

In this Example, the rolling resistance was measured by mounting and inflating the tire on a metal rim and allowing it to be turned by a 67 inch diameter dynamometer under about 80 percent of its rated load at a rate equivalent to a vehicular speed of 50 mph and the drag force measured. The test is believed to be somewhat standard.

The skid resistance was a standard test in which the tires are mounted on opposite sides of a weighted, drawn trailer at various speeds and brakes of the trailer applied and skid force (peak and slide) measured.

In this Example, the Isoprene/Acrylonitrile rubber is prepared by emulsion polymerizing Isoprene and Acrylonitrile. The butadiene/acrylonitrile rubber is prepared similarly and is expected to produce similar results.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having an outer circumferential tread where said tread is a sulfur cured rubber composition comprised of, based on 100 parts by weight rubber (phr). (A) about 30 to about 90 parts by weight cis 1,4-polyisoprene rubber having a cis 1,4-content of about 96 to about 99 percent, (B) about 5 to about 20 parts by weight of at least one synthetic rubber selected from at least one of isoprene/acrylonitrile copolymer and butadiene/acrylonitrile copolymer comprised of from about 20 to about 40 mole percent units derived from acrylonitrile and about 60 to about 80 mole percent units derived from isoprene or butadiene in which the glass transition temperature of the rubber is from about —40° C. to about -31 5° C. where said copolymers are random emulsion polymerization prepared copolymers, and (C) about 0 to about 35 parts by weight of at least one of styrene/butadiene copolymer rubber, 1,4-polybutadiene rubber containing up to 10 percent vinyl unsaturation and 1,4-polybutadiene rubber having from 30 to 70 percent vinyl unsaturation, isoprene/butadiene rubber or styrene/isoprene/butadiene rubber.

2. The tire of claim 1 where component (B) of said tread composition is isoprene/acrylonitrile rubber.

3. The tire of claim 1 where component (C) of said tread composition is present in an amount of about 10 to about 35 parts by weight.

4. The tire of claim 1 where said tread composition is comprised of, based on 100 parts by weight rubber (phr) (A) about 50 to about 90 phr natural rubber, (B) about 5 to about 20 phr of said isoprene/acrylonitrile rubber, and (C) about 0 to about 35 phr of least one other rubber selected from SBR, 1,4-polybutadiene, or 1,4-polybutadiene with 30 to 70 percent vinyl content.

5. The tire of claim 4 where component (C) of said tread composition is present in an amount of about 10 to about 35 phr.

* * * * *